US008217938B2

(12) United States Patent
Chen et al.

(10) Patent No.: US 8,217,938 B2
(45) Date of Patent: Jul. 10, 2012

(54) METHOD AND APPARATUS FOR DETERMINING ITEM ORIENTATION

(75) Inventors: Yifan Chen, Ann Arbor, MI (US); Basavaraj Tonshal, Livonia, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1060 days.

(21) Appl. No.: 11/756,126

(22) Filed: May 31, 2007

(65) Prior Publication Data

US 2008/0297507 A1 Dec. 4, 2008

(51) Int. Cl.
*G06T 17/00* (2006.01)
*G06T 15/00* (2011.01)
(52) U.S. Cl. .................. 345/424; 345/419; 345/420
(58) Field of Classification Search ........... 345/419
See application file for complete search history.

(56) References Cited

U.S. PATENT DOCUMENTS

2006/0012597 A1* 1/2006 Chakraborty ............... 345/419
2006/0114252 A1* 6/2006 Ramani et al. ............. 345/419

OTHER PUBLICATIONS

Peyrat, Jean-Mac, Maxime Sermesant, Xavier Pennec, Herve Delingette, Chenyang Xu, Elliot McVeigh, and Nicholas Ayache. "Towards a Statistical Atlas of Cardiac Fiber Structure." Proc. of the 9th International Conference on Medical Image Computing and Computer Assisted Intervention (MICCAI'06), Part I (2006).*

Akenine-Moller, Tomas. "Fast 3D Triangle-Box Overlap Testing." Journal of Graphics Tools 6 (2001): 29-33.*
Ericson, Christer. "pp. 107-111, 169-175, 308." Real-time Collision Detection: Christer Ericson. Amsterdam etc.: Elsevier, 2005.*
Kaufman, Arie, Daniel Cohen, and Roni Yagel. "Volume Graphics." IEEE Computer 26.7 (Jul. 1993): 51-64.*
He, Zhiying, and Xiaohui Liang. "A Point-Based Rendering Approach for Mobile Devices." Proceedings of the 16th International Conference on Artificial Reality and Telexistence (2006): 26-30.*
Ju, Tao. "Robust Repair of Polygonal Models." ACM Transactions on Graphics 23.3 (2004): 888-95.*
Miller, Kurt. "Voxel Mesh Creation and Rendering." Kurt Millers Homepage. Oct. 27, 2002. Web. Feb. 4, 2011. <http://kurtm.flipcode.com/devlog-VoxelMeshCreationandRendering.shtml>.*
Berthold K.P. Horn, "Extended Gaussian Images" (1984).
DETC2002/DAC-34102, "A Mesh Feature Paradigm for Rapid Generation of CAE-Based Design of Experiments Data", (2002).
DETC'00/DAC-14268, A Real-Time, Interactive Method for Fast Modification of Large-Scale CAE Mesh Models (2000).
Cover page: Christer Ericson, "Real Time Collision Detection", p. 308, Chapter 7, "Spatial Partitioning" (1 pg).
Cover page: Addison-Welsey "3D Games Real-Time Rendering and Software Technology", p. 448 "Collision Detection" (1 pg).

(Continued)

*Primary Examiner* — Xiao M. Wu
*Assistant Examiner* — Scott E Sonners
(74) *Attorney, Agent, or Firm* — Raymond L. Coppiellie; Brooks Kushman P.C.

(57) ABSTRACT

A computer-implemented method and computer software for calculating an orientation for an item. A bounding cube is constructed which encompasses a mesh representation of the item. The bounding cube is divided into a plurality of voxel elements. A data structure may be used to subdivide the bounding cube. Calculations are performed to determine which of the plurality of voxel elements intersect with the mesh, defining a voxel representation of the item. A statistical analysis is performed on the voxel representation to determine an orientation for the item.

28 Claims, 4 Drawing Sheets

OTHER PUBLICATIONS

Foley et al., "Computer Graphics: Principles and Practice" (2d Ed.) The Systems Programming Series.
Funkhouser et al., "A Search Engine for 3D Models" (2002).
Horn, "Extended Gaussian Images" (Jul. 1983).
DETC2005-85314, "An Approach to Drawing-Like View Generation From 3D Models" (2005).
Kang et al., "The Complex EGI: A New Representation for 3-D Pose Determination" (1993).
J.P. Marques de Sa, "Applied Statistics Using SPSS, Statistical and MATLAB" (pp. 284-289).
Moller, "A Fast Triangle-Triangle Intersection Test" (pp. 1-5).
Sederberg et al., "Free-Form Deformation of Solid Geometric Models" (1986).
Vranic et al., "A Feature Vector Approach for Retrieval of 3D Objects in the Context of MPEG-7" (4 pgs.).
IDETC2005/DAC-84214, "Geometric Surface Features Applied to Volumetric CAE Mesh Models", (ASME 2005).

* cited by examiner

```
1.   //Buil Octree to desired depth
2.   OctreeNode *BuildOctree(Point center, halfWidth,stopDepth){
3.     // If octree subdivision level is reached
4.     if )(stopDepth < 0)
5.       return NULL;
6.     else {
7.       // Construct new Node
8.       OctreeNode *pNode = new OctreeNode ;
9.       // Fill in the OctreeNode members
10.        ....
11.      // Recursively construct the eigth children of the sub tree
12.      for (ii = 0; ii < d; ii++)
13.          // Calculate the New center using center and hald Width
14.          pNode->pChild[ii] = BuildOctree(NewCenter, halfWidth * 0.5f, stopDepth - 1);
15.       return pNode;
16.    }
17. }
```

Fig. 5

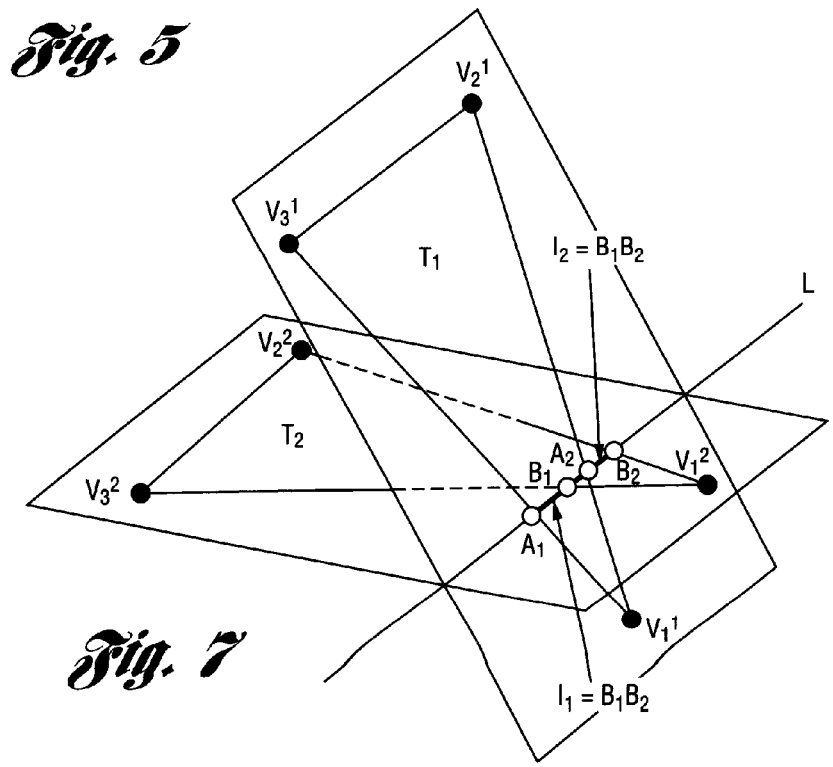

Fig. 7

```
1.  Bool FindWhichoctant (Element (Ej), OctantRootNode){

2.  level=0;
3.  List SubOctants, TmpSubOctants;
4.  SubOctants, Pushback(OctantRootNode)
5.  While (level < MaximumDepthOfOctree){
6.      TmpSubOctants.clear ();
7.      For (jj=0;jj< Size of (SubOctants): jj++){
8.          For (ii=0;ii<8;ii++){
9.              If (!SubOctants[jj] ->Child [ii] ->IsMarked){
10.                 IsInside=CheckElementtInsideVoxelCell(Ej, SubOctants>Child[ii]);
11.                 if(IsInside)
12.                     TmpSubOctants. Pushback (SubOctants ->Child[ii]);
13.             }// End IsNotMarked
14.         }// Number of children
15.     }// End of SuBoctants 16.     SubOctants.Clear();
17.     SubOctants = TmpSubOctants;
18.     Level++;
19. }// End of while 20.     intFoundNewOctant=0;
21.     for( kk=0;kk<Size Of(SubOctants);kk++){
22.             If(I SubOctants[kk]->IsMarked){
23.                 SubOctants[kk]->IsMarked = 1;
24.                 FoundNewOctant = 1;
25.             }
26.     }
27.     return FoundNewOctant;

METHOD AND APPARATUS FOR DETERMINING ITEM ORIENTATION

BACKGROUND OF THE INVENTION

Determination of virtual item orientation based on its natural shape and proportion is a fundamental issue in a wide range of applications involving computer vision, robotics, biometrics, digital 3-D model database search, collision detection, pattern recognition, etc.

The Extended Gaussian Image (EGI) method for determining item orientation maps a plurality of surface normal vectors of an item onto a unit sphere in a way that the starting point of each normal vector is located at the center of the sphere and the end point on the surface of the sphere. The resulting area on the sphere spotted by the surface normals is known as a Gaussian map. Together with the end point a mass is placed which is equal to a local surface area where the normal is evaluated. From this a histogram of orientation is created and this histogram can be used to determine part orientation.

The EGI method works well for convex parts. If the parts are concave, however, different shapes may produce same or very similar EGI representation. In general, this method is suited for treating items described by a mesh type of representation, such as most Computer-Aided Engineering (CAE) mesh models made of finite elements. However, it can be applied to other representations as well with proper pre-processing. A Computer-Aided Design (CAD) surface, for instance, can be tessellated into a mesh before the method is applied, while a point cloud can be triangulated to a mesh first in order to apply it. One drawback of the EGI method, however, is its sensitivity to underlying mesh density and noise in the data.

Another statistical method which may be used to determine item orientation is Principal Component Analysis (PCA). PCA may be used to understand the contribution of variables to data distribution. It calculates uncorrelated linear combinations of data variables for which variances are maximized. PCA determines the principal components (direction) by solving for the Eigenvalues and Eigenvectors of co-variance matrix (inertia matrix). The principal direction vector with largest Eigenvalue gives a vector that has maximum co-variance and minimum deviation.

A drawback of PCA, when applied to models defined by meshes of nodes and elements, is that the results are tessellation-dependent because of sensitivity to mesh point distribution (density, evenness of spread, etc). For example, two finite element meshes derived from the same item model, but with different mesh node distribution characteristics, often yield different principal components. PCA, like EGI, is tessellation dependent yielding unstable or unreliable results.

SUMMARY OF THE INVENTION

An objective of one or more embodiments the present invention is to more reliably determine the orientation of an item model in a manner that is less susceptible to tessellation than prior art techniques.

Another objective of one or more embodiments of the present invention is to generate a voxel representation of an item model to neutralize or at least reduce the effects of tessellation in a mesh representation of the model.

One embodiment of the present invention is a computer-implemented method for calculating an orientation for an item. A mesh representation of an item having a plurality of elements and nodes is generated or received. The mesh may be a surface mesh, a volumetric mesh, or a combination of the two.

A bounding cube is constructed which encompasses the mesh. The bounding cube is divided into a plurality of voxel elements. A data structure may be used to subdivide the bounding cube into the plurality of voxels which may be cubical.

Calculations are performed to determine which of the plurality of voxel elements intersect with the mesh. The intersecting voxel elements define a voxel representation of the item. The intersection determination may include dividing each voxel surface into triangular elements, and determining whether any of the triangular voxel elements intersect with any of the mesh elements. An interval overlap computation may be made to determine the triangular intersections.

A statistical computation may be performed on the voxel representation to determine an orientation for the item. The statistical computation may include a principal component analysis, and may be performed on a center point of each voxel element in the voxel representation of the item.

Steps of the described process may be iteratively repeated to generate a more coordinate system independent orientation for the item.

Other embodiments of the present invention include computer software or one or more computers programmed and configured to perform computational aspects of the described process, or variations thereof.

BRIEF DESCRIPTION OF THE FIGURES

FIG. 5 is example pseudo code for constructing an octree data structure;

FIG. 6 is example pseudo code for determining which voxels intersect with the mesh elements; and FIG. 7 graphically illustrates the use of an interval overlap method to test intersection between two triangles $T_1$ and $T_2$.

DETAILED DESCRIPTION OF PREFERRED EMBODIMENTS

Figure 1:
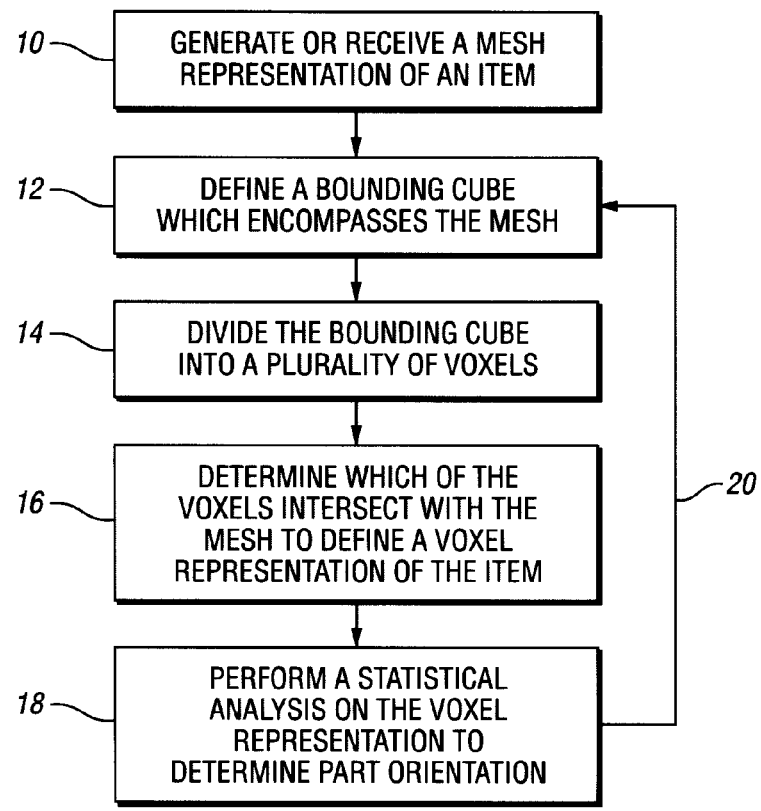
FIG. 1 is a block flow diagram illustrating one methodology for implementing an embodiment of the present invention.

FIG. 1 is a block flow diagram illustrating one methodology for implementing an embodiment of the present invention. The steps illustrated in FIG. 1 may be rearranged, modified or supplemented to best-fit a particular implementation of the present invention. Some examples of such variations are described below.

At step 10, a mesh representation of an item (which may be an assembly of items) is generated. The item may be modeled using a finite element surface meshing or other known virtual computer modeling technique. Embodiments of the present invention may also be applied to volumetric meshes comprising tetrahedral, hexahedral or other volumetric elements. Further, embodiments of the present invention may be applied to models with a mixture of surface and volumetric meshes. Alternatively, the mesh is generated separately and received as an input to the process. In this implementation, the mesh may be retrieved from computer-readable media such as a CD-ROM, DVD, Flash memory, or retrieved from persistent or volatile memory configured in operable communication with a computer for implementing the process.

At step 12, a bounding cube is defined which encompasses the mesh representation of the item. At step 14, the bounding cube is subdivided into a plurality of voxel elements. At step 16, calculations are preformed to determine which of the voxels intersect with the mesh representation. Collectively, the intersecting voxels define a voxel representation of the item. At step 18, a statistical analysis is performed on the the voxel representation of the item to determine the item's orientation. As represented by arrow 20, the process may be repeated. Steps 10-20, and variations thereof, are described in greater detail below.

Computing the Bounding Box and Bounding Cube

One aspect of an embodiment of the present invention includes computing a bounding box and bounding cube for a modeled item. In an example using a three dimensional Cartesian coordinate system (other coordinate systems may be utilized) and a finite element surface mesh, the x, y and z coordinates of all mesh nodes representing an item are determined in a global model space. The minimum and maximum values of these coordinates are locates along each of the three axial directions of the model space. The results may be used to create a bounding box or virtual workspace for the item.

Figure 2:
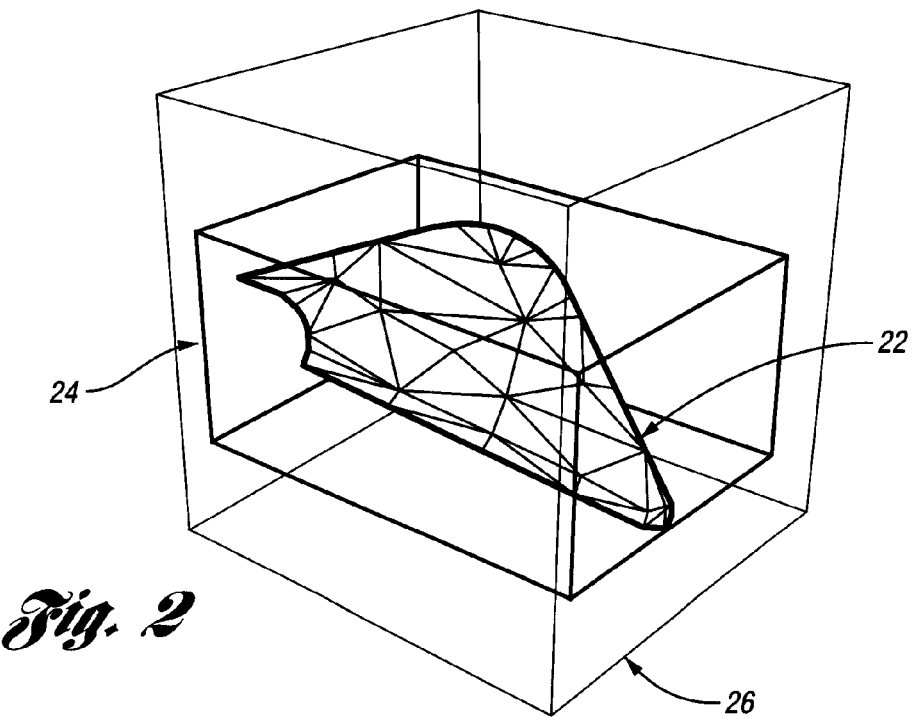
FIG. 2 illustrates an example mesh representation of a model, a resulting bounding box, and a scaled bounding cube.

The bounding box may be scaled so that the two smaller dimensions are increased to be equal to the largest dimension, resulting in a bounding cube. This step ensures that each voxel (described below) will be cubical and uniformly spaced. FIG. 2 illustrates a mesh representation of a model 22, a resulting bounding box 24, and a scaled bounding cube 26.

Voxelixing the Bounding Cube

Figure 3:
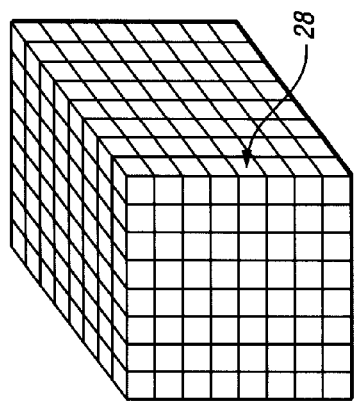
FIG. 3 illustrates an example bounding cube subdivided into a plurality of voxel elements.
Figure 4:
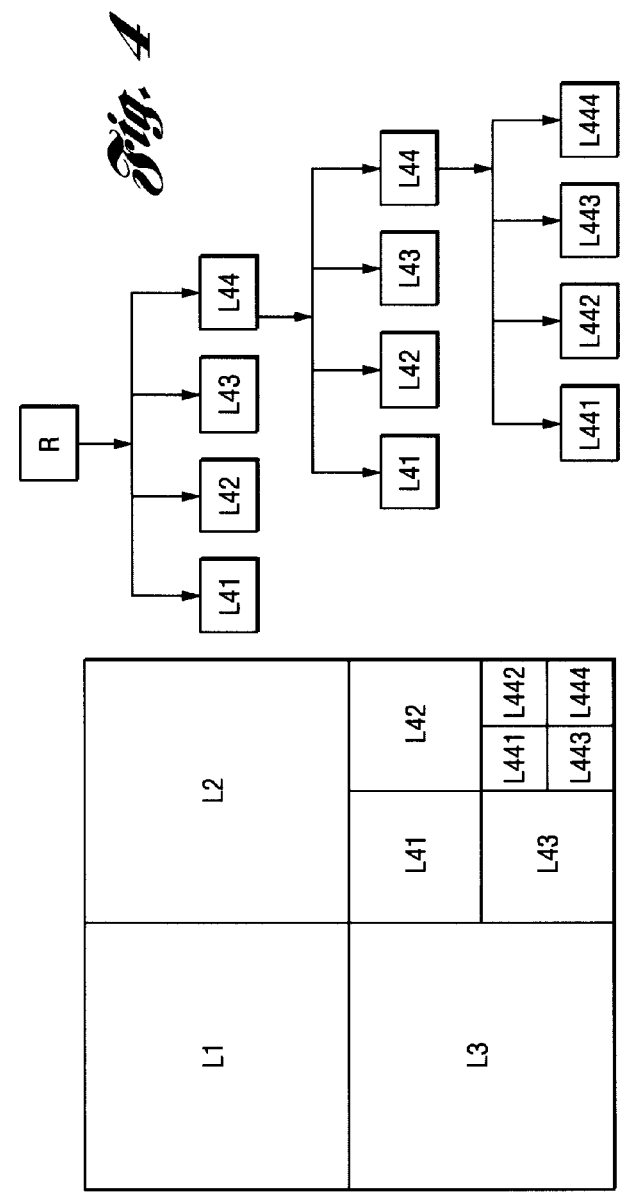
FIG. 4 illustrates an example data structure for subdividing a bounding cube into a plurality of voxel elements.

The space inside the bounding cube 26 is computationally subdivided into a plurality of cubical voxels 28, as illustrated in FIG. 3. A data structure may be implemented to represent a map of the voxels. One type of data structure that may be used is an octree data structure, as illustrated in FIG. 4 with a quadtree data structure. Other data structures, such as three-dimensional arrays, may be utilized.

Using the data structure, the space within the bounding cube can be recursively partitioned as necessary. The result of the recursive partition is a set of voxels that collectively represent the entire space with a resolution dictated by the physical size of space and the volume of voxels created (and thus the level of recursion).

With the octree data structure, each parent node has eight children. And these eight children have eight children of their own. Each octree node has a pointer back to parent and a pointer to each of the eight children. At the last level, octree nodes will not have any children.

Octree nodes may be defined according to the following data structure:

```
OctreeNode {
    Bounding Box (Xmax, Ymax, Zmax, Xmin, Ymin, Xmin);
    Center (X,Y,Z);
    IsMarked;
    OctreeNode *Parent;
    OctreeNode *child[8];
};
```

FIG. 5 illustrates example pseudo code for building an octree data structure. Of course, other code may be utilized to construct an octree or another type of data structure.

Recursive subdivision is performed to voxelize the bounding cube space. So each recursion will produce $2^3$ times as many voxels as their parents. The maximum depth of the octree recursion may vary. Because an objective of the present invention is to filter out details that are non-essential to determining item orientation, such as mesh node distribution and small shape features, it may not be desirable to have deep levels of subdivision. A universal level for all reorientation tasks may be set. For example, given the dimension L of a bounding cube, the resolution e of a voxel map may be defined by a fixed subdivision level n according to the following equation:

$$e = L/2^n$$

Because the bounding box is reference coordinate system dependent, meaning that the same item described with two reference coordinate systems not aligned to each other will result in two different bounding boxes, the method may be applied more than once. For example, the method may be applied once to find a rough reorientation, and then again to obtain a more precise reorientation. This process may provide more consistent results and make the method more coordinate system-independent.

Voxel Map and Mesh Element Intersection

In this step, a subset of voxels that represents the item model are identified. The voxel representation of the item will be an input to a computation to determine the orientation of the item.

Calculations may be performed to determine which voxel cells intersect with the model or mesh boundary. Depending on the item, interior elements of a mesh may or may not be ignored.

One approach to determine an intersection between a voxel cell and a mesh element is the node-based approach. In this approach, a calculation is performed to determine whether or not the cell includes at least one of the mesh's element nodes. While this approach will work, it suffers from the limitation that, in some cases, a boundary may intersect with a voxel in a location of the mesh that has no node, resulting in a no-intersection calculation.

Another approach is a modification of the element-based approach. This approach makes the intersection determination based on an intersection between the voxel cell (a cube with six faces or 12 triangles) and a triangular element. In this approach, each of the cube's 12 faces is tested for intersection with the mesh. If an intersection occurs, the voxel may be marked for inclusion in the final results. This approach may yield more robust results because it relies on the continuous representation of the model, rather than a set of discrete data points of the mesh (nodes).

Example pseudo code for finding the mesh element with which octree defined voxels intersect is provided in FIG. 6. An interval overlap method based on the separating axis theorem may be utilized. In this method twelve triangles are constructed from a voxel cube V (which is an axis-aligned cube). For this example, the mesh is assumed to include only triangular elements. However, any surface or volumetric element can ultimately be decomposed into triangular elements.

FIG. 7 graphically illustrates the use of the interval overlap method to test intersection between two triangles $T_1$ and $T_2$ with vertices $V_1^1, V_2^1, V_3^1$ and $V_1^2, V_2^2, V_3^2$, respectively. L represents the intersection line of the two planes of the triangles. If the two triangles intersect as illustrated then their intervals $I_1$ and $I_2$ must overlap. On the other hand, if the planes do not intersect, then their intervals on line L do not overlap. This is the basic premise of the interval overlap method.

Two steps may be taken to determine a triangle-triangle intersection with the interval overlap method. First, a plane equation may be computed for triangle $T_1$ as follows:

$$P1: N^1 \cdot (V - V_1^1) = 0$$

where N is the plane normal that can be found by $$N^1 = (V_3^1 - V_2^1) \times (V_2^1 - V_1^1)$$

and $V_1^1$, $V_2^1$, and $V_3^1$ are three vertices of $T_1$. One of the two half spaces of P1 may be considered a positive half space if any point located in this space, when being substituted for V in the above plane equation, will result in a non-negative value of the equation. Similarly, a negative half space of the plane is the one that, when substituting V with any point in this space, the plane equation will yield a non-positive value. By checking the sign of the result of the plane equation, one can determine in which of its half spaces any point is located.

Applying this method, one can check if all three vertices of triangle $T_2$ are on the same side of the $T_1$ plane, and if so a conclusion of no intersection may be made. If all three vertices of triangle $T_2$ are not on the same side of the $T_1$ plane, the two scalar intervals $I_1$ and $I_2$ are computed in a second step. In this step, a plane equation is first computed for triangle $T_2$ as follows:

$$P2: N^2 \cdot (V - V_1^2) = 0$$

where $N^2$ is the plane normal of $T_2$ that can be found by $$N^2 = (V_3^2 - V_2^2) \times (V_2^2 - V_1^2)$$

and $V_1^2$, $V_2^2$, and $V_3^2$ are three vertices of $T_2$. The intersection between the two planes (P1 and P2) is then found (as L in the Figure). As shown in FIG. 7, interval $I_1$ is a line segment on L but bracketed by the two edges of triangle $T_1$, and interval $I_2$ a line segment on L but bracketed by the two edges of triangle $T_2$. If $I_1$ and $I_2$ do not intersect along L, then the two triangles do not either. Otherwise the two triangles do intersect.

To further improve the computation, the original bounding box from which the bounding cube is defined can be utilized to eliminate those voxels that lie between the bounding cube and the bounding box.

Orientation Calculations

Voxel cells that intersect with the model boundaries make up a voxel representation of the model. This representation may be used as an input to a statistical computation to determine the orientation of the modeled item. One statistical computation which may be used is a Principal Component Analysis (PCA) which determines the three principal component vectors. Other computational methods may be used, such as the Extended Gaussian Image technique. In the PCA embodiment, the data input may comprise the centers of the intersecting voxel cells. Voxel vertices or other locations among the voxels may be utilized.

Co-variance of the input data may be calculated according to the following equation.

$$\text{cov}(x, y) = \frac{\sum_{i=1}^{i=n}(x_i - \bar{x})(y_i - \bar{y})}{n - 1}$$

where $\bar{x}$ and $\bar{y}$ are the mean values of n number of data points $x_i$ and $y_i$, which are the centers of voxels intersecting the mesh model. The covariance of the data is used then for constructing the covariance matrix R as follows:

$$R = \begin{pmatrix} \text{Cov}(x, x) & \text{Cov}(y, x) & \text{Cov}(z, x) \\ \text{Cov}(x, y) & \text{Cov}(y, y) & \text{Cov}(z, y) \\ \text{Cov}(x, z) & \text{Cov}(y, z) & \text{Cov}(z, z) \end{pmatrix}$$

In this case, Cov (x, y)=Cov (y, x). Hence, this matrix is symmetrical about its diagonal. The Eigenvalues ($\lambda$) and Eigenvectors A may be determined using the following equation:

$$[R - \lambda I] * A = 0$$

Solving this equation for the three Eigenvectors yields the natural orientation of the model. In this case, all three Eigenvectors are orthogonal to each other, which is ideal for forming a local Cartesian coordinate frame to define the natural orientation of the mesh.

System Implementation

The computational aspects of the present invention described above may be coded in an appropriate computer programming language, such as Visual C++, compiled into computer instructions and recorded on computer readable media. Computer readable media may include but is not limited to CD-ROM, DVD, Flash Memory, etc. The instructions may be executed on a personal computer. A PC having 1 GB memory and a clock speed of 2.99 GHz is suitable, but an unlimited number of computer configurations may be used.

What is claimed:

1. A computer-implemented method for calculating an orientation for an item, the method comprising:
   (i) receiving, in a computer, a mesh representation of an item, the mesh having a plurality of elements and nodes;
   (ii) constructing, by the computer, a bounding cube which encompasses the mesh;
   (iii) dividing, by the computer, a bounding cube into a plurality of voxel elements;
   (iv) determining, by the computer, which of the plurality of voxel elements intersect with the mesh, wherein a voxel representation of the item is defined by the voxel elements that intersect with the mesh;
   (v) calculating, by the computer, one or more input values based on the voxel representation of the item to determine an orientation of the item;
   (vi) inputting the voxel representation input values to a statistical computation to obtain a statistical part orientation output;
   (vii) determining, by the computer, the orientation of the item based on the statistical part orientation output.

2. The method of claim 1 wherein the mesh representation is a surface mesh.

3. The method of claim 1 wherein the mesh is a volumetric mesh.

4. The method of claim 1 wherein the statistical computation performed includes a principal component analysis.

5. The method of claim 1 wherein the input value is a center point of each voxel element in the voxel representation of the item.

6. The method of claim 1 wherein a data structure is used to subdivide the bounding cube into the plurality of voxels.

7. The method of claim 6 wherein the data structure is an octree data structure.

8. The method of claim 1 wherein each voxel element is a cube of equal size.

9. The method of claim 1 wherein the determination of which of the plurality of voxel elements intersect with the mesh comprises determining whether the voxel elements include a node of the mesh.

10. The method of claim 1 wherein each voxel is a cube comprising six surfaces, and wherein the determination of which of the plurality of voxel elements intersect with the mesh comprises determining whether any of the voxel surfaces intersect with any of the mesh elements.

11. The method of claim 10 wherein each of the six voxel cube surfaces are divided into two triangle elements, and wherein the determination of which of the plurality of voxel elements intersect with the mesh comprises determining whether any of the triangle elements intersect with any of the mesh elements.

12. The method of claim 11 wherein an interval overlap computation is used to determine whether any of the triangle elements intersect with any of the triangular mesh elements.

13. The method of claim 1 wherein the mesh comprises a surface mesh and a volumetric mesh.

14. The method of claim 1 wherein steps (i) through (vii) are performed to obtain a first reorientation of the item, and wherein steps (i) through (vii) are repeated on the first reorientation of the item to obtain a second reorientation of the item.

15. An apparatus comprising tangible computer-readable media having computer instructions recorded thereon, the instructions directing one or more computers to:
 (i) receive input defining a mesh representation of an item, the mesh having a plurality of elements and nodes;
 (ii) calculate a bounding cube which encompasses the mesh;
 (iii) subdivide the bounding cube into a plurality of voxel elements;
 (iv) determine which of the plurality of voxel elements intersect with the mesh, wherein a voxel representation of the item is defined by the voxel elements that intersects with the mesh;
 (v) calculate one or more input values based on the voxel representation of the item to determine an orientation of the item.
 (vi) input the voxel representation input values to a statistical computation to obtain a statistical part orientation output; and
 (vii) determine the orientation of the item based on the statistical part orientation output.

16. The apparatus of claim 15 wherein the mesh representation is a surface mesh.

17. The apparatus of claim 15 wherein the mesh is a volumetric mesh.

18. The apparatus of claim 15 wherein the mesh comprises both a surface mesh and a volumetric mesh.

19. The apparatus of claim 15 wherein the statistical computation performed includes a principal component analysis.

20. The apparatus of claim 15 wherein the input value is a center point of each voxel element in the voxel representation of the item.

21. The apparatus of claim 15 wherein a data structure is used to subdivide the bounding cube into the plurality of voxels.

22. The apparatus of claim 21 wherein the data structure is an octree data structure.

23. The apparatus of claim 15 wherein each voxel element is a cube of equal size.

24. The apparatus of claim 15 wherein the instructions for determining which of the plurality of voxel elements intersect with the mesh include instructions for determining whether the voxel elements include a node of the mesh.

25. The apparatus of claim 15 wherein each voxel is a cube comprising six surfaces, and wherein the instructions for determining which of the plurality of voxel elements intersect with the mesh include instructions for determining whether any of the voxel surfaces intersect with any of the mesh elements.

26. The apparatus of claim 25 wherein each of the six voxel cube surfaces are divided into two triangle elements, and wherein the instructions for determining which of the plurality of voxel elements intersect with the mesh include instructions for determining whether any of the triangle elements intersect with any of the mesh elements.

27. The apparatus of claim 26 wherein the instructions for determining whether any of the triangle elements intersect with any of the triangular mesh elements include an interval overlap computation.

28. The apparatus of claim 15 wherein instructions (i) through (vii) are executed to obtain a first reorientation of the item, and wherein instructions (i) through (vii) are repeated on the first reorientation of the item to obtain a second reorientation of the item.

* * * * *